United States Patent
Yang et al.

(10) Patent No.: US 12,484,708 B1
(45) Date of Patent: Dec. 2, 2025

(54) INFLATABLE BED

(71) Applicant: Reestar International Limited, Hong Kong (CN)

(72) Inventors: Xinju Yang, Hong Kong (CN); Gaoming Liang, Hong Kong (CN); Xili Wu, Hong Kong (CN); Chakfu Yu, Hong Kong (CN)

(73) Assignee: Reestar International Limited, Hong Kong (CN)

( * ) Notice: Subject to any disclaimer, the term of this patent is extended or adjusted under 35 U.S.C. 154(b) by 0 days.

(21) Appl. No.: 19/192,490

(22) Filed: Apr. 29, 2025

(30) Foreign Application Priority Data

Mar. 14, 2025 (CN) .......................... 202520456420.4

(51) Int. Cl.
    *A47C 27/08* (2006.01)
    *A61G 7/057* (2006.01)

(52) U.S. Cl.
    CPC .......... *A47C 27/087* (2013.01); *A47C 27/081* (2013.01); *A61G 7/05769* (2013.01); *A47C 27/08* (2013.01); *A61G 7/057* (2013.01)

(58) Field of Classification Search
    CPC ..... A47C 27/087; A47C 27/081; A47C 27/08; A61G 7/05769; A61G 7/057
    USPC .................. 5/712, 711, 706, 644, 654, 655.3
    See application file for complete search history.

(56) References Cited

U.S. PATENT DOCUMENTS

| | | | | |
|---|---|---|---|---|
| 5,490,295 A | * | 2/1996 | Boyd | A47C 27/087 5/687 |
| 5,960,495 A | * | 10/1999 | Hsu | A47C 27/087 5/710 |
| 7,089,618 B1 | * | 8/2006 | Metzger | A47C 27/087 5/709 |
| 7,337,485 B2 | * | 3/2008 | Metzger | A47C 27/087 5/711 |
| 10,631,659 B2 | * | 4/2020 | Xia | B29C 66/1122 |
| 10,945,533 B1 | * | 3/2021 | Shi | A47C 27/081 |
| 11,330,914 B2 | * | 5/2022 | Ocegueda Gallaga | A47C 27/083 |
| 11,969,098 B1 | * | 4/2024 | Shi | A47C 27/087 |
| 12,082,702 B1 | | 9/2024 | Tang | |
| 12,256,844 B2 | * | 3/2025 | Shi | A47C 27/081 |
| 12,279,700 B2 | * | 4/2025 | Ocegueda Gallaga | B29C 66/433 |
| 2007/0044243 A1 | * | 3/2007 | Metzger | A47C 27/087 5/710 |
| 2015/0335164 A1 | * | 11/2015 | Liu | F24F 13/20 156/278 |
| 2017/0238718 A1 | * | 8/2017 | Xia | B29C 65/04 |
| 2020/0187668 A1 | * | 6/2020 | Ocegueda Gallaga | B29C 66/1122 |

(Continued)

*Primary Examiner* — Robert G Santos

(57) ABSTRACT

An inflatable bed includes a bed body and at least one support member. The bed body defines an inflation chamber and includes a first wall and a second wall arranged opposite to the first wall. A direction perpendicular to the first wall and the second wall is defined as a first direction. The at least one support member is arranged in the inflation chamber. Each of the at least one support member includes at least two tension bands extending along the first direction. The at least two tension bands are connected with the first wall and the second wall. A width of each of the at least two tension bands extends along a second direction perpendicular to the first direction. The at least two tension bands are spaced apart from each other in a third direction perpendicular to each of the first direction and the second direction.

20 Claims, 12 Drawing Sheets

(56) References Cited

U.S. PATENT DOCUMENTS

| | | | |
|---|---|---|---|
| 2022/0273116 A1* | 9/2022 | Ocegueda Gallaga | ............... A47C 27/087 |
| 2025/0049226 A1 | 2/2025 | Shi | |

\* cited by examiner

INFLATABLE BED

CROSS REFERENCE TO RELATED APPLICATIONS

The present application claims the priority of the Chinese patent application No. 202520456420.4, filed on Mar. 14, 2025, contents of which are incorporated herein by its entireties.

FIELD

The present disclosure relates to the field of inflatable products, particularly to an inflatable bed.

BACKGROUND

Inflatable beds are portable and can be placed freely. By inflating gas into the bed, the bed expands to form a supportive structure for users. Typically, an inflatable bed includes two end walls arranged opposite to each other and support members connecting the two end walls to maintain the bed's shape.

When pressure is applied to the inflatable bed, gas in the inflatable may shift, causing a local expansion of the inflatable bed. After the pressure is released, the gas redistributes uniformly, and compressed area of the inflatable bed rebounds. During the expansion and recovery process, the two end walls pull on the support members, which may lead to breakage or separation at connection points between the support members and the end walls.

SUMMARY

An inflatable bed is provided in the present disclosure. The inflatable bed includes a bed body and at least one support member. The bed body defines an inflation chamber and includes a first wall and a second wall arranged opposite to the first wall. A direction perpendicular to the first wall and the second wall is defined as a first direction. The at least one support member is arranged in the inflation chamber. Each of the at least one support member includes at least two tension bands extending along the first direction. The at least two tension bands are connected with the first wall and the second wall. A width of each of the at least two tension bands extends along a second direction perpendicular to the first direction. The at least two tension bands are spaced apart from each other in a third direction perpendicular to each of the first direction and the second direction.

BRIEF DESCRIPTION OF THE DRAWINGS

To provide a clearer illustration of the technical solutions in the embodiments of the present disclosure or in the related art, a brief introduction will be given to the drawings used in the description of the embodiments or the related art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
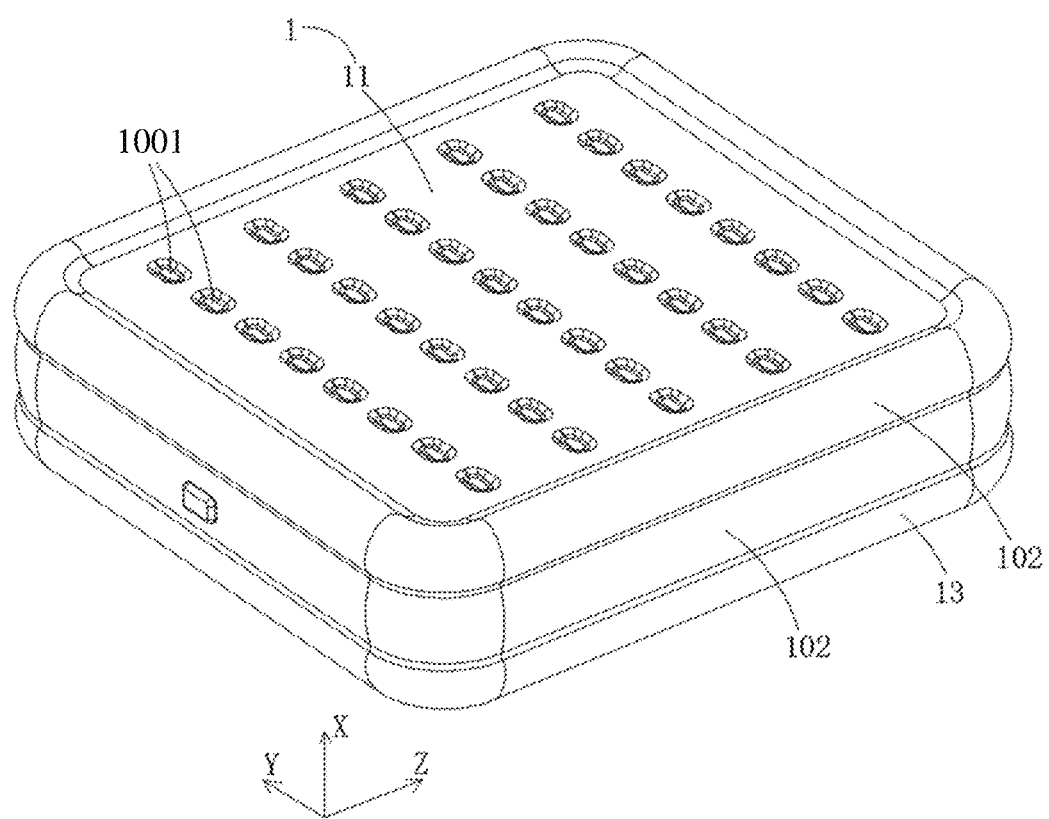
FIG. 1 is a schematic view of an external structure of an inflatable bed according to an embodiment of the present disclosure, showing a plurality of first connection portions between each support member and a first wall.

1—bed body; 11—first wall; 12—second wall; 13—enclosure wall; 100—inflation chamber; 101—secondary air cavity; 102—reinforcement airbag; 1001—first connection portion; 1002—second connection portion;

2—support member; 20—tension band; 200—first through-hole; 201—first connecting segment; 202—second connecting segment; 21—first connecting piece; 22—second connecting piece;

3—side band; 31—first connecting edge; 32—second connecting edge; 33—second through-hole;

X—first direction; Y—second direction; Z—third direction.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1 to 12, the present disclosure provides an inflatable bed. The inflatable bed includes a bed body 1 and at least one support member 2. The bed body 1 defines an inflation chamber 100 and includes a first wall 11, a second wall 12, and an enclosure wall 13. The first wall 11 and a second wall 12 are arranged opposite to each other. The enclosure wall 13 is connected with each of the first wall 11 and the second wall 12. The first wall 11, the second wall 12, and the enclosure wall 13 cooperatively define the inflation chamber 100 which can be sealed. At least one of the first wall 11, the second wall 12, and the enclosure wall 13 is arranged with an inflation/deflation valve. The inflation chamber 100 can be inflated to expand the bed body 1 and provide support through the inflation/deflation valve. When gas in the inflation chamber 100 is fully released, the bed body 1 can be folded to reduce volume for convenient storage.

Figure 2:
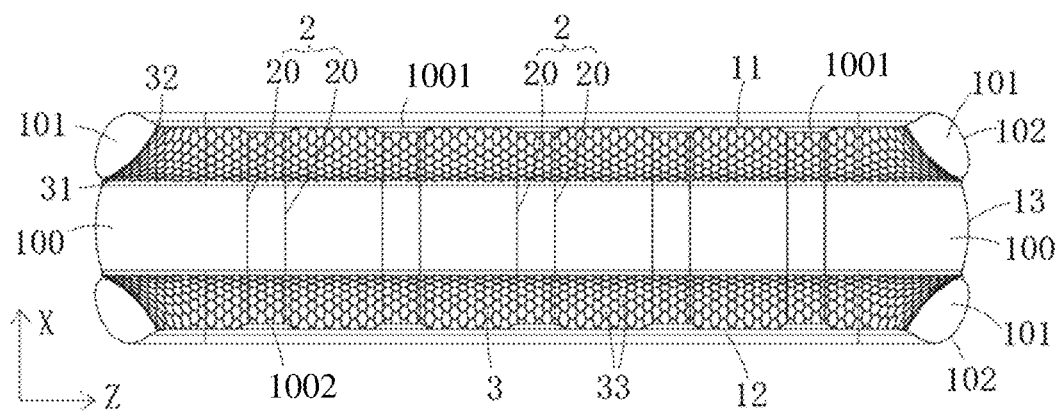
FIG. 2 is a cross-sectional view of the inflatable bed in a X-Z plane according to an embodiment of the present disclosure.
Figure 3:
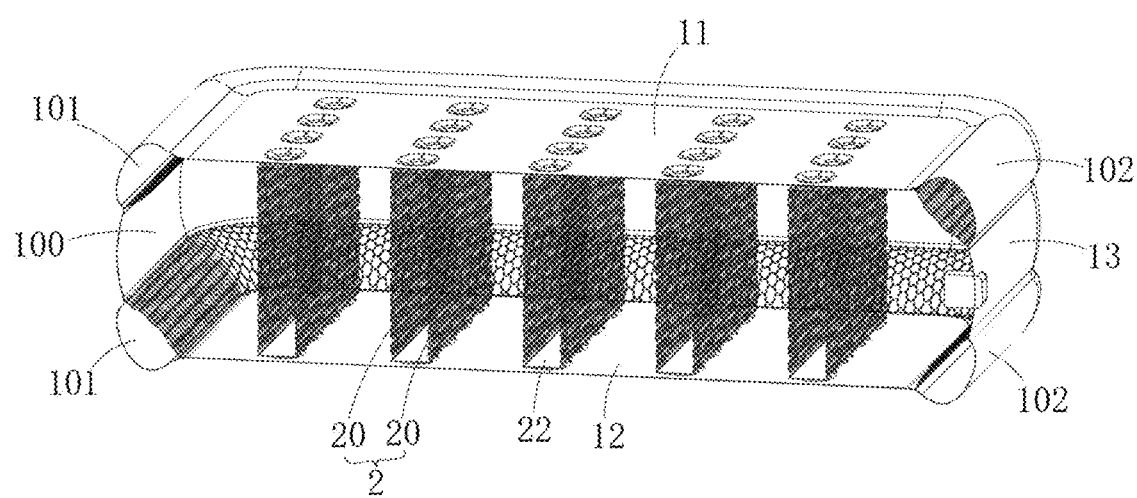
FIG. 3 is a schematic view of an internal structure of a bed body according to an embodiment of the present disclosure.

Referring to FIGS. 1 and 2, the first wall 11 and the second wall 12 are arranged opposite each other. A direction perpendicular to the first wall 11 and the second wall 12 is defined as a first direction X. The support member 2 is located in the inflation chamber 100 and includes at least two tension bands 20 extending along the first direction X. Each tension band 20 has two ends arranged away from each other. One of the two ends is connected to the first wall 11, and the other of the two ends is connected to the second wall 12. A width of the tension band 20 extends along a second direction Y perpendicular to the first direction X. The tension band 20 is arranged in a sheet-like structure and extends in a plane, increasing a connection area between the tension band 20 and the first wall 11 and a connection area between the tension band 20 and the second wall 12. When the inflation chamber 100 is inflated and expands, since an acting face between the tension band 20 and each of the first wall 11 and the second wall 12 effectively increases, a pulling force exerted by the tension band 20 on each of the first wall 11 and the second wall 12 can be reduced, thereby minimizing risk of separation or breakage at the connection points between the tension band 20 and each of the first wall 11 and the second wall 12 and extending service life of the inflatable bed.

To enhance the above-mentioned effect, the at least two tension bands 20 of the support member 2 are spaced apart from each other in a third direction Z perpendicular to each of the first direction X and the second direction Y Specifically, the at least two tension bands 20 are spaced apart at least at one end. In other words, the at least two tension bands 20 are non-coplanar. For example, in one embodiment shown in FIG. 4, the two tension bands 20 are parallel to each other. In another embodiment shown in FIG. 9, the two tension bands 20 are arranged in a splayed configuration. Increasing the number of tension bands 20 in each support member 2 further enlarges an overall contact area between the support member 2 and each of the first wall 11 and the second wall 12.

In another aspect, the tension band 20 defines a plurality of first through-holes 200, making at least localized regions of the tension band 20 more deformable. When the bed body 1 is compressed or begins to recover after the external force is removed, the first wall 11 and the second wall 12 cooperatively pull on the support member 2. In other words, both ends of the support member 2 are subjected to pulling forces from the first wall 11 and the second wall 12. Since certain regions of the tension band 20 are more prone to deformation, these regions will exhibit greater deformation, effectively elongating the tension band 20 and reducing the reactive force exerted by the tension band 20 on each of the first wall 11 and the second wall 12, thereby distributing stress. In some embodiments, the tension band 20 is arranged in a mesh structure, with the plurality of first through-holes 200 distributed in a grid pattern in the tension band 20. In this way, a weight of the tension band 20 can be reduced, thereby lowering an overall weight of the bed body 1 and minimizing a storage volume of the bed body 1. Additionally, overall deformability of the tension band 20 can be enhanced. The tension band 20 is made of a fabric material, such as nylon, to improve durability of the tension band 20. Moreover, the mesh design of the tension band 20 facilitates faster and more even gas distribution during inflation of the inflatable bed.

Specifically, the support member 2 is attached to the first wall 11 and the second wall 12 via high-frequency pressing. Alternatively, other methods such as ultrasonic welding, thermal bonding, adhesive bonding, stitching, or mechanical fastening such as pins may also be used.

A plurality of support members 2 are arranged along the third direction Z to distribute the pulling forces exerted by the support members 2 more evenly across the bed body 1, thereby maintaining an overall shape of the bed body 1.

The first wall 11 may be a top wall, and the second wall 12 may be a bottom wall; or the first wall 11 may be a left wall, and the second wall 12 may be a right wall; or the first wall 11 may be a front wall, and the second wall 12 may be a rear wall. In the following description, an embodiment where the first wall 11 is the top wall and the second wall 12 is the bottom wall is used as an example. In this case, the first direction X corresponds to a height direction of the bed body 1, the second direction Y corresponds to a width direction of the bed body 1, and the third direction Z corresponds to a length direction of the bed body 1.

Furthermore, the support member 2 further includes a first connecting segment 201 and a second connecting segment 202. The first connecting segment 201 and the second connecting segment 202 are arranged opposite to each other. Each of the first connecting segment 201 and the second connecting segment 202 is connected to the at least two tension bands 20. The first connecting segment 201 is attached to the first wall 11, and the second connecting segment 202 is attached to the second wall 12.

The inflatable bed further includes a first connecting piece 21 and a second connecting piece 22. The first connecting piece 21 is configured to fix the first connecting segment 201 to the first wall 11, and the second connecting piece 22 is configured to fix the second connecting segment 202 to the second wall 12. Specifically, the first connecting piece 21 is attached to the first wall 11 via the high-frequency pressing, and the second connecting piece 22 is attached to the second wall 12 via the high-frequency pressing.

Figure 6:
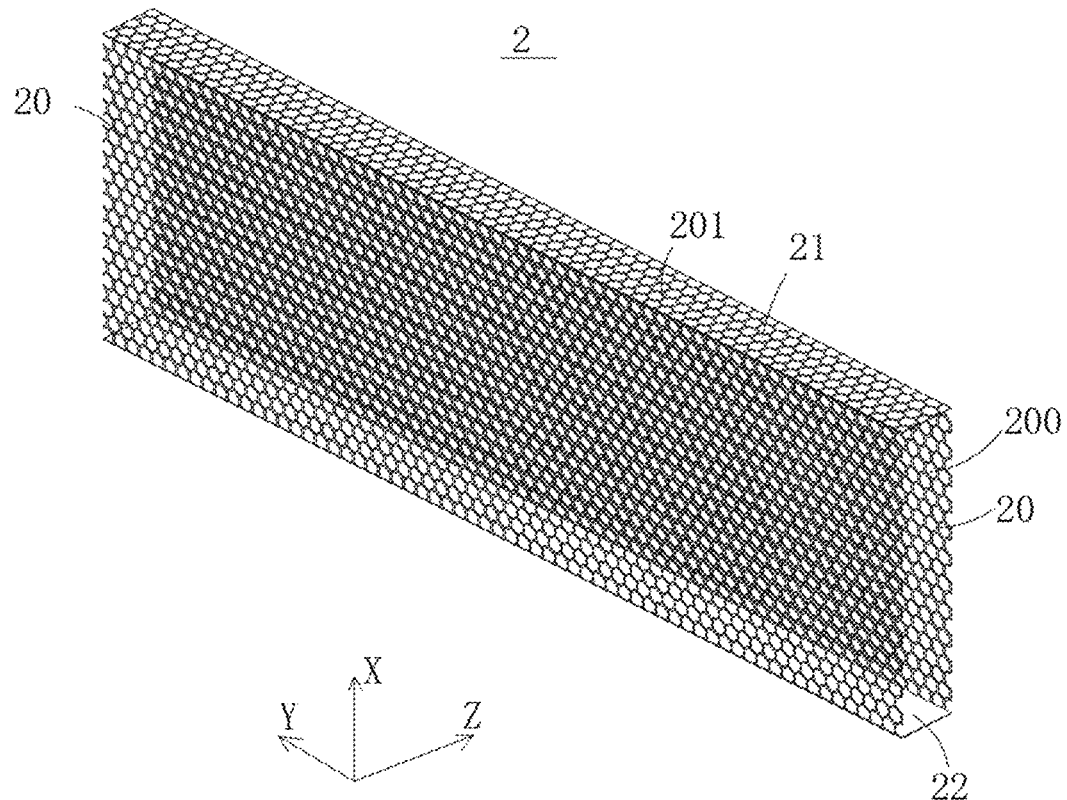
FIG. 6 is a structural view of the support member according to another embodiment of the present disclosure.

In one embodiment, as shown in FIG. 6, each support member 2 includes only two tension bands 20, one first connecting segment 201, and one second connecting segment 202. The two tension bands 20, the one first connecting segment 201, and the one second connecting segment 202 are integrally formed as a one-piece structure, meaning the support member 2 is configured as a single unit that is then attached to the bed body 1 via the first connecting piece 21 and the second connecting piece 22. In this embodiment, the first connecting segment 201 is sandwiched between the first connecting piece 21 and the first wall 11, and the second connecting segment 202 is sandwiched between the second connecting piece 22 and the second wall 12.

Figure 4:
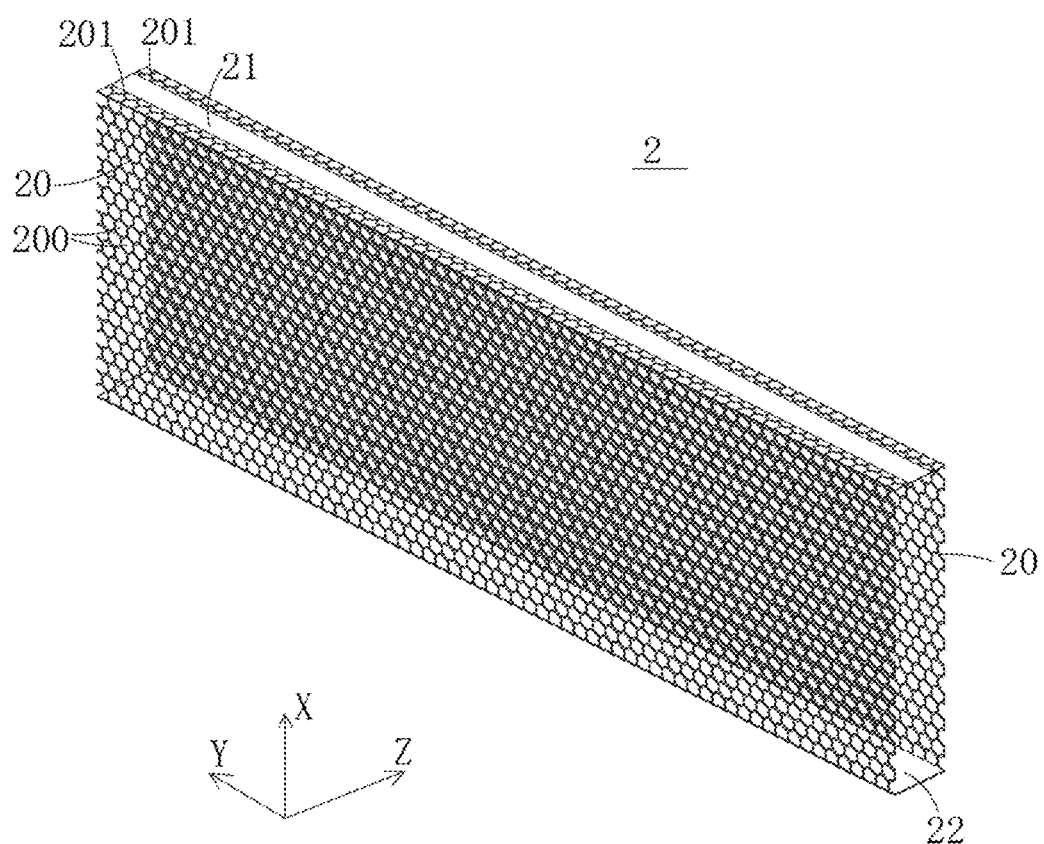
FIG. 4 is a structural view of a support member according to an embodiment of the present disclosure.
Figure 5:
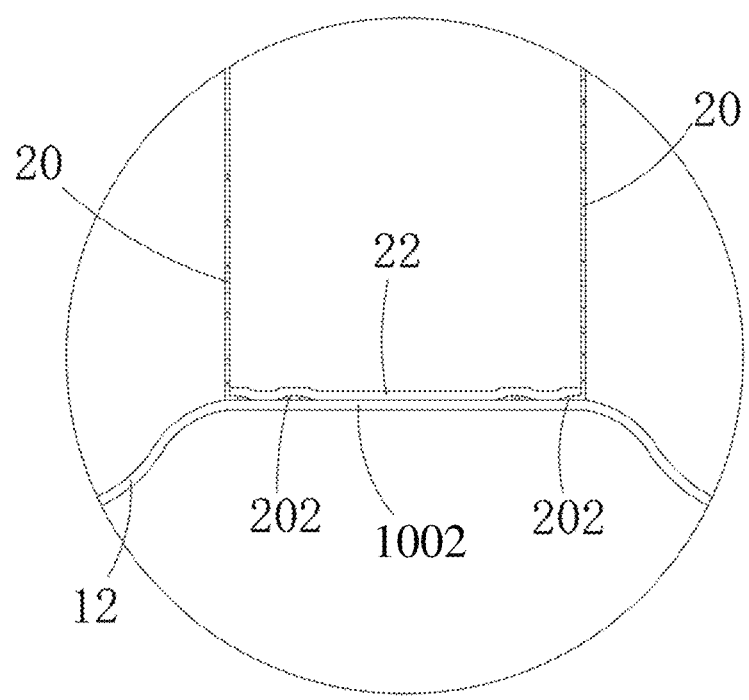
FIG. 5 is a cross-sectional view of a second connection portion between the support member and a second wall according to an embodiment shown in FIG. 3.

In another embodiment, as shown in FIGS. 4 and 5, each support member 2 includes only two tension bands 20, two first connecting segments 201, and two second connecting segments 202. Each of the two first connecting segments 201 is connected to a respective one of the two tension bands 20. The two first connecting segments 201 are connected with each other via the first connecting piece 21. Similarly, each of the two second connecting segments 202 is connected to a respective one of the two tension bands 20. The two second connecting segments 202 are connected with each other via the second connecting piece 22. Each tension band 20 is integrally formed as a one-piece structure with a respective first connecting segment 201 and a respective second connecting segment 202. In other words, the two tension bands 20 are essentially independent units that are connected together via the first connecting pieces 21 and the second connecting piece 22. In this embodiment, the first connecting segment 201 is sandwiched between the first connecting piece 21 and the first wall 11, and the second connecting segment 202 is sandwiched between the second connecting piece 22 and the second wall 12.

Figure 7:
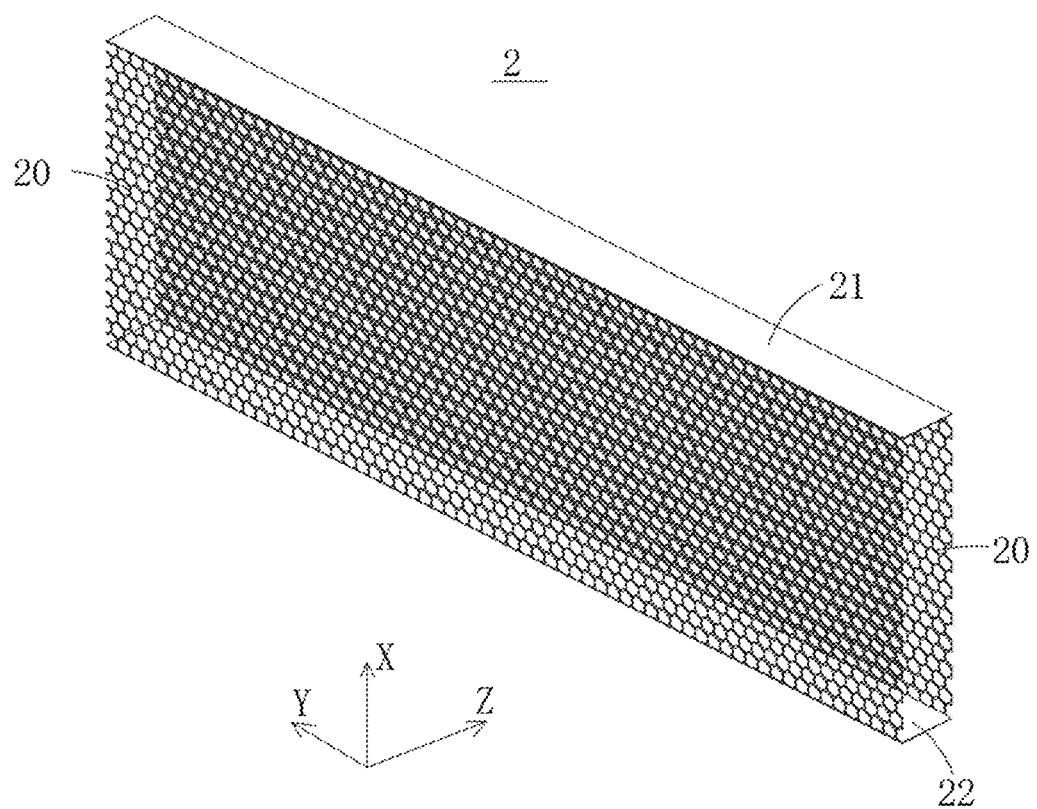
FIG. 7 is a structural view of the support member according to yet another embodiment of the present disclosure.
Figure 8:
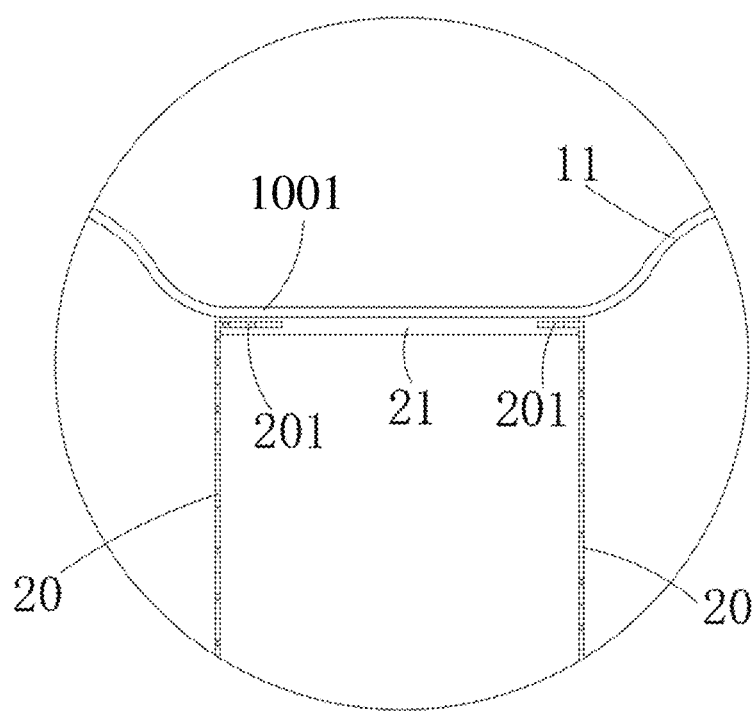
FIG. 8 is cross-sectional view of a first connection portion between the support member and the first wall according to an embodiment shown in FIG. 6.
Figure 9:
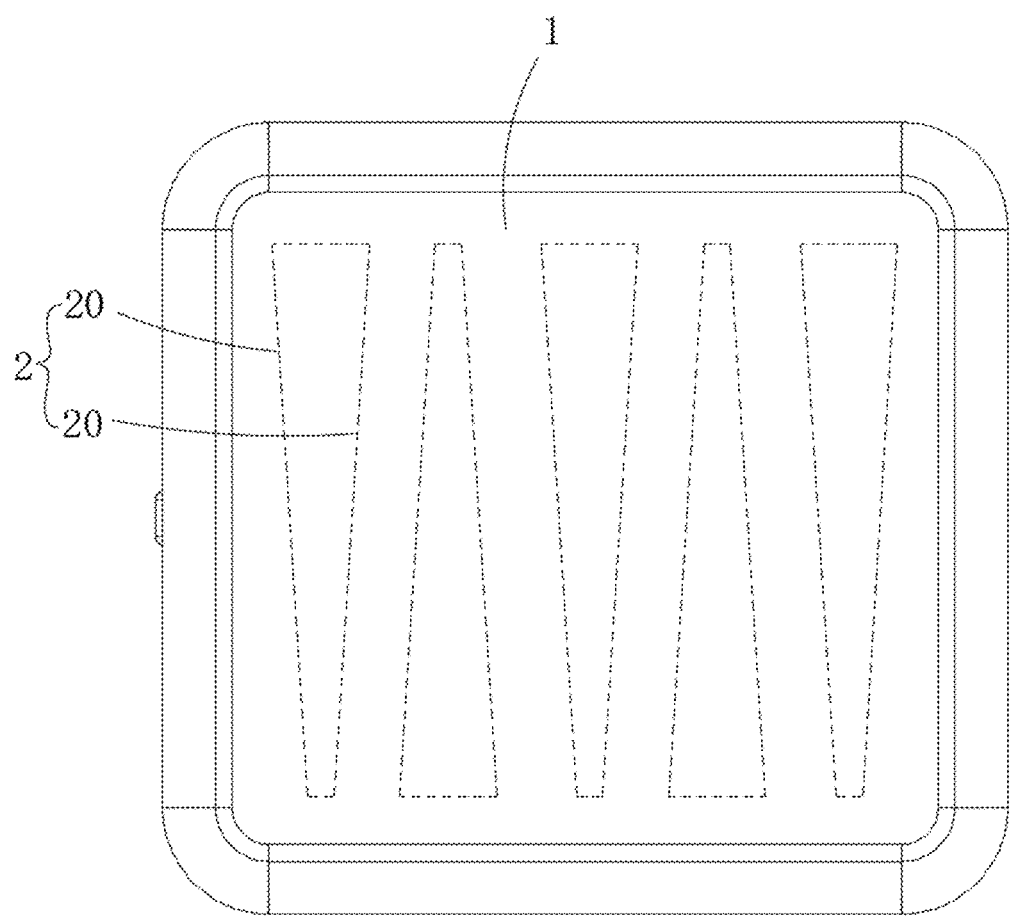
FIG. 9 is a schematic view showing a shape relationship between two tension bands included in the support member according to other embodiments of the present disclosure.

In other embodiments, as shown in FIGS. 7 and 8, the support member 2 is configured similarly to either of the two aforementioned embodiments, with the difference being that the first connecting piece 21 is arranged to wrap the first connecting segment 201 and then welded to the first wall 11. It is understandable that a structural hierarchy at a connection point of the first wall 11 and the support member 2 is, in order: an inner wall of the bed body 1, the first connecting piece 21, the first connecting segment 201, and the first connecting piece 21 again. In this way, the first connecting segment 201 can be attached to the first wall 11. Similarly, the second connecting piece 22 is arranged to wrap the second connecting segment 202 and then welded to the second wall 12. It is understandable that a structural hierarchy at a connection point of the second wall 12 and the support member 2 is, in order: an inner wall of the bed body 1, the second connecting piece 22, the second connecting segment 202, and the second connecting piece 22 again. In this way, the second connecting segment 202 can be attached to the second wall 12.

Figure 10:
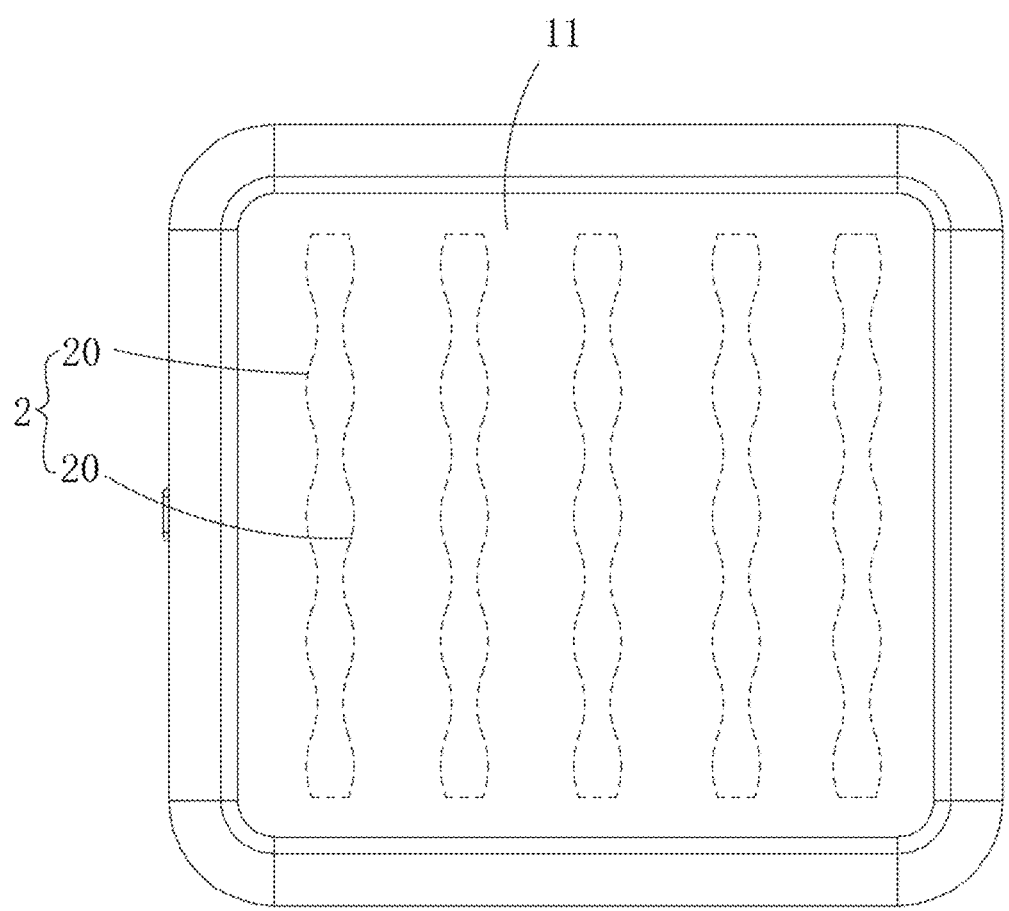
FIG. 10 is a schematic view showing a shape of a contact face between the support member and the first wall according to further embodiments of the present disclosure.
Figure 11:
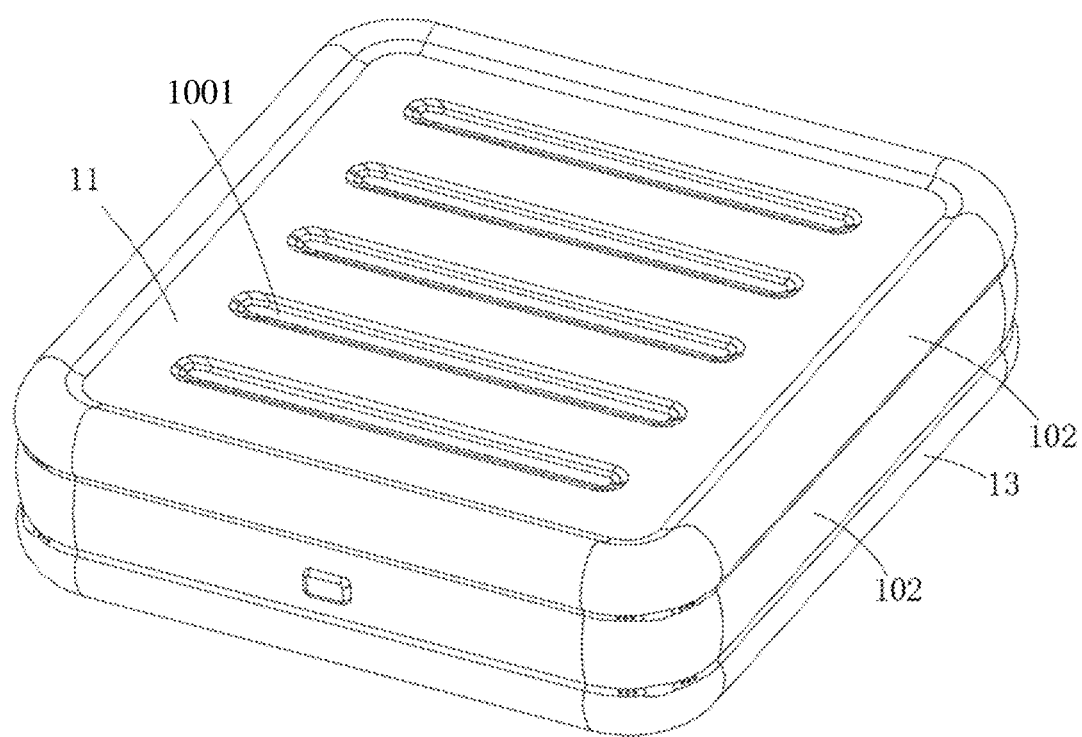
FIG. 11 is a schematic view of the external structure of the inflatable bed according to another embodiment of the present disclosure, showing only one first connection portion between the each support member and the first wall.

Additionally, the first connecting piece 21 and the second connecting piece 22 may each have an elongated shape including at least one of a rectangle and a wave. A contact face between the support member 2 and at least one of the first wall 11 and the second wall 12 has a shape selected from the group consisting of a rectangle, a wavy curve, a closed loop, and a trapezoid. For example, FIG. 10 shows an embodiment where the contact face between the support member 2 and the first wall 11 has a wavy curved shape. Alternatively, at least one edge of each of the first connecting piece 21 and the second connecting piece 22 may be wavy, curved, or in other shapes, with the tension bands 20 correspondingly shaped to provide larger connection areas by the first connecting piece 21 and the second connecting piece 22 and enhance structural stability of the bed body 1. In some embodiments, as shown in FIG. 11, each first connecting piece 21 and the first wall 11 have a continuous connection portion, and each second connecting piece 22 and the second wall 12 also have a continuous connection portion. In other embodiments, as shown in FIG. 1, a plurality of first connection portions 1001 are formed between each first connecting piece 21 and the first wall 11, and a plurality of second connection portions 1002 are formed between each second connecting piece 22 and the second wall 12, resulting in a plurality of recesses in the surface of the first wall 11 at the first connection portions 1001 and a plurality of recesses in the surface of the second wall 12 at the second connection portions 1002. In this way, surface flatness of the first wall 11 and the second wall 12 can be reduced, improving friction between the bed body 1 and human body or ground to prevent slipping and enhance safety. Additionally, deformation of the tension bands 20 can be promoted, distributing forces at the first connecting piece 21 and the second connecting piece 22.

In some embodiments, as shown in FIGS. 2, 4, 6, and 7, each support member 2 includes two tension bands 20, and a cross section of the support member 2 has a rectangular or trapezoidal shape in a plane defined by the first direction X and the third direction Z. The figures only show the rectangular cross section, allowing the contact area between the support member 2 and each of the first wall 12 and the second wall 12 larger, resulting in more balanced force distribution across the inflatable bed. When the first wall 11 and the second wall 12 pull on the support member 2, the larger contact area reduces a unit force at the connection points between the support member 2 and each of the first wall 11 and the second wall 12, effectively extending the service life of the inflatable bed. Additionally, the support member 2 in a rectangular or trapezoidal shape is easier to fuse with the first wall 11 and the second wall 12 of the bed body 1 during manufacturing, simplifying production process.

In some embodiments, the two tension bands 20 are arranged parallel to each other, and the two tension bands 20, the first connecting piece 21, and the second connecting piece 22 cooperatively form a tubular structure with a rectangular cross section.

In some embodiments, a spacing between the two tension bands 20 ranges from 5 cm to 20 cm. In other words, each of a width of the first connecting piece 21 and a width of the second connecting piece 22 is in a range of 5 cm and 20 cm. Particularly, the spacing is 10 cm.

Figure 12:
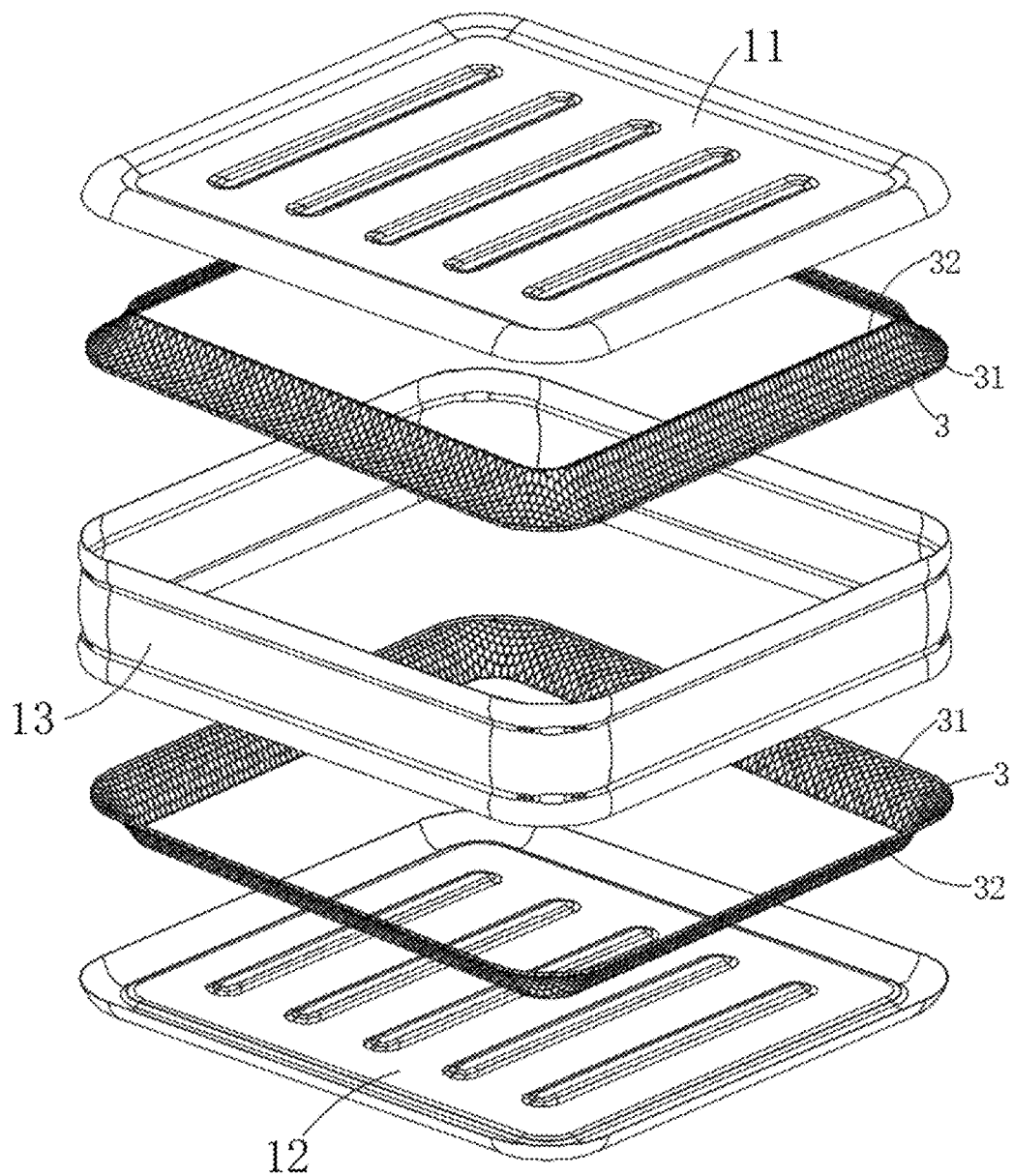
FIG. 12 is an exploded view of the inflatable bed according to an embodiment of the present disclosure.

In some embodiments, as shown in FIGS. 2 and 12, the inflatable bed further includes at least one side band 3 located in the inflation chamber 100. The side band 3 is arranged in a closed-loop structure and includes a first connecting edge 31 attached to the enclosure wall 13 and a second connecting edge 32 attached to the first wall 11 or the second wall 12. The side band 3, at least a portion of the enclosure wall 13, and the first wall 11 cooperatively define a secondary air chamber 101; or the side band 3, at least a portion of the enclosure wall 13, and the second wall 12 cooperatively define a secondary air chamber 101. The side band 3 defines a plurality of second through-holes 33. The plurality of second through-holes 33 communicate the inflation chamber 100 and the secondary air chamber 101.

When air is pumped into the inflation chamber 100, air flows through the second through-holes 33 into the secondary air chamber 101 to inflate the secondary air chamber 101. Due to a pulling force exerted by the side band 3 on the enclosure wall 13 and the first wall 11 or the second wall 12, the inflated secondary air chamber 101 forms at least one reinforcement airbag 102 around an edge of the bed body 1, which serves to strengthen a structural shape of the bed body 1 and prevent deformation after inflation of the bed body 1. Particularly, two side bands 3 are provided. One of the two side bands 3 one connects the enclosure wall 13 to the first wall 11, and the other of the two side bands 3 connects the enclosure wall 13 to the second wall 12, forming reinforcement airbags 102 around both an edge of the first wall 11 and an edge of the second wall 12.

After the inflation chamber 100 and the secondary air chamber 101 are fully inflated, when pressure is applied to the bed body 1, the gas in the secondary air chamber 101 will spread around a pressure point, potentially causing localized gas accumulation and a sharp increase in pressure on the bed body 1 and the side band 3. Repeated localized pressure can shorten the service life of the inflatable bed and lead to unexpected damage. Therefore, in this embodiment, the side band 3 defines the second through-holes 33 at least in areas prone to gas accumulation, allowing airflow between the inflation chamber 100 and the secondary air chamber 101 to prevent a sharp pressure increase caused by localized airflow accumulation.

Furthermore, the plurality of second through-holes 33 are distributed in a grid pattern in the side band 3, and the side band 3 is arranged in a mesh structure which is annular. In this way, all parts of the secondary air chamber 101 can be communicated to the inflation chamber 100. Alternatively, it can be understood that the bed body 1 is essentially arranged in a single-chamber structure, with the side band 3 in a mesh-design primarily providing support. The side band 3 can effectively bear pressure on the edges of the bed body 1 when under weight, maintaining an original shape of the bed body 1 and preventing edge collapse or deformation that could cause users to slip off. Additionally, stability and reliability of the bed body 1 can be further enhanced, improving safety of the inflatable bed and protecting users.

In some embodiments, the side band 3 is made of a fabric material, such as nylon, to improve durability of the side band 3.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. An inflatable bed, comprising:
   a bed body, defining an inflation chamber and comprising a first wall and a second wall arranged opposite to the first wall, wherein a direction perpendicular to the first wall and the second wall is defined as a first direction; and
   at least one support member, arranged in the inflation chamber, wherein each of the at least one support member comprises at least two tension bands extending along the first direction, the at least two tension bands are connected to the first wall and the second wall, and a width of each of the at least two tension bands extends along a second direction perpendicular to the first direction;
   wherein the at least two tension bands are spaced apart from each other in a third direction perpendicular to each of the first direction and the second direction;
   wherein each of the at least one support member further comprises at least two first connecting segments, each of the at least two first connecting segments is connected to and extending from an end of a respective one of the at least two tension bands near the first wall;
   the inflatable bed further comprises a first connecting piece; the first connecting piece comprises a first sub-piece and a second sub-piece; the first sub-piece is disposed between the first wall and the at least two first connecting segments; the second sub-piece is disposed at a side of the at least two first connecting segments away from the first wall; and the at least two first connecting segments are disposed between the first sub-piece and the second sub-piece;
   the at least two first connecting segments, which are disposed between the first sub-piece and the second sub-piece, are disconnected from each other;
   the first connecting piece further comprises an intermediate portion disposed between the at least two first connecting segments that are disconnected from each other.

2. The inflatable bed as claimed in claim 1, wherein a cross section of the each of the at least one support member has a rectangular or trapezoidal shape in a plane defined by the first direction and the third direction.

3. The inflatable bed as claimed in claim 1, wherein the each of the at least one support member further comprises a second connecting segment, the at least two first connecting segment and second connecting segments are arranged opposite to each other, and the second connecting segment is connected to ends of the at least two tension bands near the bottom wall of the bed body, the at least two first connecting segments are indirectly attached to the first wall via the first sub-piece of the first connecting piece, and the second connecting segment is indirectly attached to the second wall.

4. The inflatable bed as claimed in claim 3, wherein the at least two first connecting segments, the second connecting segment, and the at least two tension bands are integrally formed as a one-piece structure.

5. The inflatable bed as claimed in claim 3, further comprising a second connecting piece, wherein the first connecting piece is configured to fix the at least two first connecting segment to the first wall, and the second connecting piece is configured to fix the second connecting segment to the second wall.

6. The inflatable bed as claimed in claim 5, wherein the second connecting segment is sandwiched between the second connecting piece and the second wall.

7. The inflatable bed as claimed in claim 5, wherein the first connecting piece wraps each of the at least two first connecting segments, and the second connecting piece wraps the second connecting segment.

8. The inflatable bed as claimed in claim 5, wherein a plurality of first connection portions are formed between the first connecting piece and the first wall, and a plurality of second connection portions are formed between the second connecting piece and the second wall.

9. The inflatable bed as claimed in claim 2, wherein a contact face between the at least one support member and at least one of the first wall and the second wall has a shape selected from the group consisting of a rectangle, a wavy curve, a closed loop, and a trapezoid.

10. The inflatable bed as claimed in claim 1, wherein the at least two tension bands are arranged parallel to each other.

11. The inflatable bed as claimed in claim 1, wherein a spacing width between the at least two tension bands ranges from 5 cm to 20 cm.

12. The inflatable bed as claimed in claim 1, wherein the number of the at least one support member is more than one, and the more than one support member are arranged along the third direction.

13. The inflatable bed as claimed in claim 12, wherein the first direction corresponds to a height direction of the bed body, the second direction corresponds to a width direction of the bed body, and the third direction corresponds to a length direction of the bed body.

14. The inflatable bed as claimed in claim 1, wherein the each of the at least two tension bands defines a plurality of first through-holes.

15. The inflatable bed as claimed in claim 14, wherein the plurality of first through-holes are distributed in a grid pattern in the each of the at least two tension bands, and the each of the at least two tension bands is arranged in a mesh structure.

16. The inflatable bed as claimed in claim 1, wherein the bed body further comprises an enclosure wall connected with each of the first wall and the second wall, wherein the first wall, the second wall, and the enclosure wall cooperatively define the inflation chamber;

the inflatable bed further comprises at least one side band located in the inflation chamber, the at least one side band is arranged in a closed-loop structure, and each of the at least one side band comprises a first connecting edge and a second connecting edge; the first connecting edge is connected to the enclosure wall, and the second connecting edge is connected to the first wall or the second wall;

the at least one side band, at least a part of the enclosure wall, and at least a part of the first wall cooperatively define a secondary air cavity, or the at least one side band, at least a part of the enclosure wall, and at least a part of the second wall cooperatively define a secondary air cavity, and each of the at least one side band defines a plurality of second through-holes.

17. The inflatable bed as claimed in claim 16, wherein the plurality of second through-holes are distributed in a grid pattern in the each of the at least one side band, and the each of the at least one side band is arranged in a mesh structure.

18. The inflatable bed as claimed in claim 16, wherein the number of the at least one side band is two, one of the two side bands is connected to the first wall, and the other of the two side bands is connected to the second wall.

19. The inflatable bed as claimed in claim 1, wherein the at least one support member is made of a fabric material.

20. The inflatable bed as claimed in claim 16, wherein the at least one side band is made of a fabric material.

* * * * *